3,384,633
PROCESS FOR THE ISOMERIZATION OF
VITAMIN A AND ESTERS THEREOF
Joseph A. Kardys, Groton, Conn., assignor to Chas.
Pfizer & Co., Inc., New York, N.Y., a corporation of
Delaware
No Drawing. Continuation-in-part of application Ser. No.
363,065, Apr. 24, 1964. This application Nov. 8, 1966,
Ser. No. 592,748
6 Claims. (Cl. 260—207.1)

ABSTRACT OF THE DISCLOSURE

Isomerization of vitamin A, its isomers and esters, using iodine and basic amines, particularly pyridine, as catalysts. Relatively inactive 11-cis and 11,13-di-cis isomers thus converted to mixtures of vitamin A and neovitamin A without formation of additional inactive 9-cis vitamin A isomer. Vitamin A esterification and transesterification using alkali metal alkoxide as catalyst, improved by presence of alkali metal borohydride and basic amine.

---

This invention relates to improved processes for the esterification including transesterification, and isomerization of vitamin A, vitamin A isomers and esters thereof. More specifically it relates to the use of iodine and basic amines to catalyze the isomerization of vitamin A, vitamin A isomers and carboxylic acid esters thereof, to bleach vitamin A alcohol and ester concentrates, and to the use of alkali metal borohydrides and basic amines as enhancers of the alkaline esterification of vitamin A, vitamin A isomers and carboxylic acid esters thereof.

The subject application is a continuation-in-part of copending application Ser. No. 363,065, filed on Apr. 24, 1964, now abandoned.

The vitamin A molecule may be depicted as

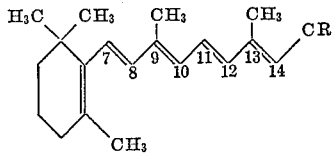

where R is a functional group such as alcohol, carboxylic acid or the like. The carotenoid number system is used to indicate the structural nature of the molecule.

It is clear, from the molecular structure of vitamin A, that several trans-cis geometrical isomers of vitamin A can exist. The all trans isomer is shown but the 13-cis, the 11-cis, the 9-cis, the 9,13-di-cis and the 11,13-di-cis are also known to exist.

In natural vitamin A, such as that present in a number of the common fish liver oils, for example, soupfin shark liver oil, cod dogfish, halibut, and California jewfish liver oil, the total vitamin A content consists of approximately 65% vitamin A, the all trans form, and approximately 35% neovitamin A, the 13-trans-cis form.

Synthetic vitamin A, on the other hand, may, depending on the process used, be obtained soley as the all trans isomer, vitamin A, or solely as the 13-trans-cis geometrical isomer or as a mixture of the various geometrical isomers. As used throughout the specification, the all trans isomer of vitamin A is referred to simply as vitamin A. The 13-trans-cis form (the double bond of the allyl alcohol moiety is cis) is referred to as neovitamin A or 13-cis. The other geometrical isomers are referred to, herein, by their characteristic structures as 11-cis; 9-cis; 9,13-di-cis and 11,13-di-cis.

Pure, or substantially pure, vitamin A and carboxylic acid esters thereof undergo a gradual conversion to other isomers, predominantly neovitamin A and esters thereof, resulting ultimately in an apparent equilibrium mixture comprising about 75%–65% vitamin A and about 25%–35% neovitamin A. Because of this transformation, vitamin compositions, particularly liquid vitamin compositions, containing a definite and known amount of vitamin A, generally as the acetate or palmitate ester, are found to undergo a loss in vitamin A potency on storage. This loss in potency is due to the fact that the 13-cis isomer is less biologically active than vitamin A. This loss in potency is, of course, detrimental from a sales standpoint. However, it can be overcome by the expedient of using an initially greater quantity of vitamin A ester to compensate for the decrease in potency or, alternatively and preferably, by employing an equilibrium mixture of vitamin A ester and neovitamin A ester, initially.

Processes for the production of synthetic vitamin A and vitamin A isomers and the esters thereof often produce relatively large proportions of vitamin A isomers. The biologial activity of these isomers is lower than the activity of the vitamin A. The 13-cis isomer has about 75 percent of the activity of vitamin A; the 9-cis isomer and the 9,13-di-cis isomer have about 23 percent of the activity of vitamin A; the 11 cis isomer has about 24 percent of the activity of vitamin A and the 11,13-di-cis isomer has about 15 percent of the activity of vitamin A. Consequently, it is advantageous to convert the vitamin A isomers to vitamin A or to the 13-cis isomer or to an equilibrium mixture of the vitamin A and the 13-cis isomer.

The cis-trans isomerization of vitamin A, vitamin A isomers and esters thereof to vitamin A, neovitamin A and esters thereof can be accomplished by the following methods: (1) refluxing in a solvent; (2) by illumination (photoisomerization); (3) acid catalysis; (4) iodine catalysis; (5) thermal isomerization.

Of the above isomerization methods, isomerization by iodine catalysis in the presence or absence of light or illumination was, prior to this invention, preferred since it permits rapid isomerization under mild conditions and thus avoids or at least minimizes destruction of vitamin A and its esters and/or oxidation by air. However, the isomerized mixtures thus produced contain substantial (up to 20%) amounts of the undesirable and biologically inactive 9-cis isomer.

It has now been found that formation of the undesirable 9-cis isomer of vitamin A can be greatly minimized, e.g. to less than 5%, by treating non-isomerized or non-equilibrated systems of vitamin A with iodine in the presence of a basic amine which functions as an improved isomerization catalyst system. In actual practice the production of the 9-cis isomer is generally less than 1% when using this novel and improved catalyst system. In like manner neovitamin A and other vitamin A isomers and esters thereof are converted to a mixture of neovitamin A and vitamin A and esters thereof having substantially the same proportions of the two isomers as the mixture obtained by isomerization of vitamin A.

The isomerization process and improved catalyst system of this invention may be used effectively to treat mixtures of vitamin A isomers and esters thereof of relatively low biological activity and isomerize these isomeric mixtures to equilibrium mixtures of vitamin A, neovitamin A and esters thereof with substantially increased biological activities. The final mixtures may also contain small amounts of the other vitamin A isomers. As a consequence of this invention, mixtures of synthetic vitamin A isomers of low biological activity, such as the 9-cis, 9,13-di-cis, 11-cis and 11,13-di-cis, may be isomerized to isomeric mixtures, of increased biological activity, which contain primarily vitamin A and neovitamin A, without the formation of additional amounts of 9-cis isomer. Where the original mixture contains amounts of the 9-cis or 9,13-di-cis isomer in excess of the amounts of these isomers which would be present in an equilibrium mixture of all the vitamin A isomers, the amounts of the 9-cis and 9,13-di-cis isomer will be reduced, by the process of this invention, to amounts close to the equilibrium levels. These observations also apply to esters of the vitamin A isomers, as well.

The iodine basic amine catalyzed isomerization of vitamin A, vitamin A isomers or their esters, e.g. acetate, α,α-dimethylpalmitate, propionate, butyrate, α-methyl-α-ethylcaproate, palmitate, β-naphthoate, anthraquinone-β-carboxylate, α-phenylazobenzoate and like esters, is conducted in a suitable solvent system, that is, a solvent which dissolves both the reactants and products. Suitable solvents are the aliphatic hydrocarbons such as n-butane, n-pentane, n-hexane, n-heptane, aromatic hydrocarbons such as benzene, toluene, xylenes; tetrahydrofuran, basic amines such as pyridine, collidines and others as enumerated below and chlorinated solvent such as methylene chloride and chloroform. The preferred solvent systems are n-hexane and/or pyridine.

It has further been found that pre-treatment of isomerized and non-isomerized vitamin A and its esters with iodine in the presence of a basic amine exerts a beneficial effect on subsequent esterification or transesterification in improving not only the color but also the odor and stability of the ester product.

The economic value of this decolorizing or bleaching feature is significant since it is frequently desirable or necessary to esterify vitamin A alcohol or to transesterify one vitamin A ester to another, e.g. acetate to palmitate. The well-known esterification or transesterification processes generally produce dark colored products, the color of which can sometimes be improved slightly but only with great difficulty. This undesired color formation occurs with both isomerized and non-isomerized forms of vitamin A, neo-vitamin A and other vitamin A isomers and esters thereof upon esterification or transesterification. For convenience the terms esterify and esterified as used hereinafter include transesterify and transesterified. The quality of these colored products is poor and their economic value is accordingly low.

In conducting the iodine-basic amine treatment, be it for the improved isomerization process of this invention or for effecting color improvement on esterification, the relative proportions of iodine:basic amine:vitamin A or related compounds are not critical but may vary widely. The particular proportions used in a given treatment, e.g. isomerization, are, to a certain extent at least, a compromise based upon a consideration of several factors such as rate of isomerization, cost of removal of the iodine and end-use of the finished product. In general, proportions of iodine:basic amine:vitamin A (or related compounds) of from about 0.1-2 g. amine:0.25-2 mg. iodine:1 g. vitamin A, equivalent to weight ratios of from about 400:1:4000 to about 8000:8:4000, are highly effective in isomerizing vitamin A and its isomers with production of a minimum of 9-cis isomer. As noted above, the non-critical nature of the ratio of reactants is brought out by the fact that the basic amine can be used as solvent system either alone or in combination with other solvents. Similar considerations apply to the iodine-basic amine system to bleach vitamin A alcohol or esters.

For the purposes of this process the iodine-basic amine may be preformed prior to its addition to the vitamin A, or other related compounds to be isomerized or esterified, or the iodine added to the vitamin A-basic amine solution without substantial effect on the course or outcome of the reaction. Alternatively, the vitamin A or related compounds may be added to the iodine-basic amine system or the vitamin A-basic amine to a solution of iodine in a suitable solvent system. For example, the basic amine can be added to a hexane solution of iodine followed by the vitamin A or its isomers; or the basic amine and iodine can be mixed separately and the resulting mixture added to the hexane (or other solvent) followed by the vitamin A or its isomers or to a solution of vitamin A or related compounds in a suitable solvent.

While a variety of basic amines, primary, secondary or tertiary in nature, can be used in this isomerization and/or esterification process with the formation of low levels of the 9-cis isomer, e.g. less than 5%, and improved color, many of them appear to produce non-equilibrated mixtures of vitamin A and neovitamin A. The favored basic amines are the tertiary heterocyclic amines such as pyridine, di- and tetrahydropyridines, piperidine, the picolines, the lutidines, the collidines, the parvolines, pyrrole, the dihydropyrroles, pyrrolidine, pyrrolidone and N-methyl pyrrolidone, quinoline, quinuclidine, pyridazine, pyrimidine and pyrazine. The preferred amine is pyridine.

It appears that the solubility of the iodine in the basic amine plays an important role in the efficiency of the iodine-amine system. The more soluble the iodine in the amine the more effective the iodine-amine system in producing the equilibrated vitamin A-neovitamin A mixture with a minimum of 9-cis isomer and improved color. Further, those basic amines which may be considered sterically hindered, that is, in which the nitrogen of the amine is not readily available to the iodine to permit complex formation, appear to be those in which the solubility of the iodine is low. Examples of these are triethanolamine, diethanolamine and 2-alkyl substituted quinolines.

The iodine-basic amine treatment is conducted, generally under an atmosphere of nitrogen, at a temperature of from about 0° C. to about 115° C., preferably at a temperature of from about 25° C. to about 70° C. The optimum temperature range is from about 50° C. to about 60° C. The treatment is carried out over a period of from about 0.5 hour to about 20 hours and preferably for a period of from about 5 to about 12 hours. Light or some form of illumination need not be present during isomerization although a promoting effect appears to be exerted on the transformation when such is present. However, the isomerization proceeds sufficiently rapidly in the absence of light or in subdued light as to preclude the specific necessity of light or illumination.

The removal of the iodine from the reaction mixtures resulting from the iodine-basic amine interconversions of vitamin A, neovitamin A and other vitamin A isomers and their esters is readily accomplished by known methods. Robeson et al. (J. Am. Chem. Soc. 69, 140 (1957)), for example, use sodium thiosulfate as reducing agent. Other common reducing agents for iodine such as sodium bisulfite, pyridine, and pyridine-zinc dust may also be used. In the case of iodine-basic amine treatment to improve color, positive improvement is noted regardless of the method used to remove iodine. However, all these agents are ineffective in lowering the iodine content to levels wherein the thermal instability associated with the presence of iodine is overcome. A preferred method is that described in U.S. Ser. No. 170,808 which uses sodium borohydride as reducing agent to produce an essentially iodine-free, thermally stable product. At least an equivalent amount, and desirably about 5 to about 10 times the weight of iodine, of sodium borohydride is used. The related potassium and lithium borohydrides can be used in lieu of sodium borohydride to effectively remove the iodine from such isomerization mixtures.

Since the acetate and palmitate esters of vitamin A are presently the principal commercial forms, the herein described process applies, in the main, to isomeric and non-isomeric mixtures obtained from the acetate and palmitate esters of vitamin A, neo-vitamin A and other vitamin isomers. However, it should be borne in mind that other esters, for example, anthraquinone-β-carboxylate, α,α-dimethylpalmitate, β-naphthoate, p-phenylazobenzoate, propionate and butyrate, of vitamin A and its isomers and the free alcohol and its isomers can be treated, e.g.

esterified and/or isomerized as described above and thence converted to the alcohol, acetate or palmitate by known methods.

It should be noted that the improved isomerization process of the present invention can be applied to vitamin A, neo-vitamin A or other vitamin A isomers or a given carboxylic acid ester thereof in the presence of an ester of the carboxylic acid moiety to be introduced by esterification or transesterification. For example, vitamin A acetate can be isomerized by means of the iodine-basic amine catalysts mentioned above in the presence of methyl palmitate to give an isomerized equilibrium mixture of vitamin A acetate, containing less than 5% 9-cis isomer, catalyst and methyl palmitate. The iodine present is destroyed by sodium borohydride as mentioned above and the resulting mixture esterified or transesterified according to the usual well-known procedure using an alkali metal hydroxide or alkoxide. In such a process it is advantageous to use a lower alkyl ester, that is, one containing 1 to 4 carbon atoms in the ester moiety, of the acid group to be introduced into the vitamin A. Such a process has the advantage of eliminating the need for isolating the isomerized vitamin A ester prior to transesterification.

The sodium borohydride present in excess of that required to decompose the iodine of the iodine-basic amine system has been found, in combination with the basic amine, to enhance the catalytic activity of the alkali metal hydroxide or alkoxide esterification catalyst and to further unexpectedly reduce discoloration during transesterification, or esterification, to give a product of highly desirable color, and stability. The sodium borohydride-basic amine combination appears to disperse the alkali metal hydroxide or alkoxide in the transesterification mixture and to prevent polymerization of the vitamin A or its isomers. Similar benefits are realized when vitamin A, neovitamin A or other vitamin A isomers are esterified under alkaline conditions, for example, with an alkali metal hydroxide or alkoxide.

The color improvement obtained in the presence of the borohydride-basic amine system is markedly greater than that realized by the iodine-basic amine pre-treatment. Esterification of vitamin A or transesterification of a vitamin A ester in the presence of borohydride-basic amine but in the absence of the iodine-basic amine pretreatment gives a product having a Gardner color (ASTM 1544–58T) of about 14 to 17. The combination of the two steps affords products having Gardner color values of about 7 to 11, said color approximating that of corn oil.

Other alkali metal borohydrides, such as potassium or lithium borohydrides, can be used in place of sodium borohydride. However, sodium borohydride is favored because of its greater availability. The amount of sodium borohydride required is not critical but can vary widely. In general, to complete removal of the iodine present an amount of sodium borohydride equal to about 5 to 10 times the weight of iodine is used. The excess sodium borohydride remaining, about 1 to 20 mg. per gram of vitamin A, neovitamin A or other vitamin A isomer or esters thereof, is adequate to produce the benefits cited above. Smaller quantities can be used; however, there appears to be less reduction in discoloration when levels of sodium borohydride 2 to 3 times the weight of iodine initially present are used. Larger quantities can also be used but with no apparent increase in the benefits noted. The excess sodium borohydride is removed by an aqueous alcohol wash or by an aqueous alcohol wash containing acetic acid.

According to the well-known transesterification or ester interchange reaction, the equilibrium is shifted in the desired direction, e.g. formation of the palmitate by removing the lower boiling by-product ester or by using a large excess of the second ester. It is preferred, because of the cleaner reaction product produced, to use a stoichiometric proportion of the second ester and remove the lower boiling by-product ester. The reaction is generally conducted at a temperature of from about 50° to 100° C. and under sufficient vacuum to effect removal of the lower boiling, by-product ester of the transesterification reaction. Alkali metal alkoxides, such as sodium and potassium alkoxides of lower alcohols having from 1 to 4 carbon atoms, are particularly useful as catalysts. The alkali metal alkoxide need not be pure but can be used in the form of the mixture obtained by the reaction of the desired alkali metal hydroxide and a lower alcohol, for example, sodium hydroxide in methanol. In general, the alcohol corresponding to the ester group of the vitamin A ester which is to be replaced is used. The alkali metal hydroxide is added to the lower alcohol and the resulting solution added to the mixture of esters, usually in small portions. From about 1% to about 3% by weight of catalyst based upon the vitamin A ester or vitamin A isomer ester is used. Smaller quantities result in slow reaction and incomplete conversion; larger quantities appear to afford no advantages. For convenience and to avoid the use of excessive quantities of catalyst, the alkali metal alkoxide catalyst is added portion-wise, the reaction mixture being stripped after each addition until removal of the lower boiling by-product ester is complete. The stepwise addition of catalyst is continued until at least 0.85 mole of by-product ester have been recovered.

Similar considerations apply to the esterification of vitamin A and neovitamin A and other vitamin A isomers, water, pyridine and methanol, the latter in excess of that required for alkali metal alkoxide formation being removed during the esterification.

The basic amines enumerated above in connection with the iodine-amine system are also operative in this step. Pyridine is the preferred amine.

It will, of course, be obvious to, and appreciated by those skilled in the art, that the herein described novel systems are also generally applicable to carotenoids.

The following examples are provided by way of illustration and are not to be construed as limitations of this invention, many variations of which are possible without departing from the scope and spirit thereof.

EXAMPLE I

Pyridine (400 ml.) and iodine (200 mg.) are stirred under an atmosphere of nitrogen at room temperature until solution is complete. Vitamin A palmitate (200 g.) is added and the mixture heated to 54–56° C. for 10 hours. The mixture is then cooled to room temperature, a freshly prepared solution of sodium borohydride (0.8 g. in 10 ml. water) added to quench the reaction and the mixture stirred for 1 hour at room temperature. Hexane (600 ml.) and water (200 ml.) are added, the mixture stirred for 5 minutes, the phases allowed to separate and the hexane layer dropped into 100 ml. of hexane. The hexane solution is extracted with water (2×100 ml.) to recover pyridine then washed further with water (3×800 ml.). Removal of the solvent in vacuo, at a temperature below 40° C. provides the isomeric esters.

Assay of the product according to the procedure of Von Planta, et al., Helv. Chim. Acta 45, 559–561 (1962), a thin layer chromatographic technique, shows the mixture contains 67% vitamin A palmitate, 30.5% neovitamin A palmitate and less than 3% 9-cis isomer.

EXAMPLE II

A mixture of iodine (50.8 mg.) and pyridine (15 mg.) in 50 ml. of hexane is stirred under an atmosphere of nitrogen until solution is complete. The solution is cooled to 0°–5° C. and vitamin A palmitate (50 g.) in 450 ml. hexane added. After stirring for 1 hour the reaction is quenched by the addition of a mixture of sodium borohydride (403.1 mg.), corn oil (411.8 mg., used to facilitate handling and transfer of the sodium borohydride) and 0.2 ml. pyridine. The mixture is stirred for one hour at room temperature and then worked up as described in Example I. Assay shows the composition to be 70.1% vitamin A palmitate, 28.2% neovitamin A palmitate and 1.7% 9-cis isomer.

EXAMPLE III

The procedure of Example II is repeated but using the conditions tabulated below to give isomerized vitamin A palmitate containing low levels of 9-cis isomer.

| VAP (g.) | Hexane (ml.) | T.° C. | Time (hrs.) | Iodine, mg./Pyridine, ml. | Hexane (ml.) | Quench Charge | Quench Time (hrs.) | Product |
|---|---|---|---|---|---|---|---|---|
| 200 | 1,800 | 0–5 | 1 | 202.1/60 | 200 | 1.6017 gm. NaBH₄<br>1.6052 ml. C.O.[1]<br>20 ml. MeOH<br>.8 ml. Pyridine<br>20 ml. Hexane | [2] 1–28 | 92.3% Trans.<br>7.5% Neo.<br>9 cis, nil. |
| 200 | 1,700 | 0–5 | 1 | 303.9/60 | 300 | 1.6049 gm. NaBH₄<br>1.6047 gm. C.O.<br>.8 ml. Pyridine<br>5 ml. MeOH<br>20 ml. Hexane | 1 | 87.2% Trans.<br>9.7% Neo.<br>3.6% 9-cis. |
| 200 | 1,800 | 0–5 | 1 | 401.0/120 | 400 | 1.6008 gm. NaBH₄<br>1.6190 gm. C.O.<br>20 ml. MeOH<br>.8 ml. Pyridine<br>20 ml. Hexane | 1 | 86.7% Trans.<br>9.0% Neo.<br>4.3% 9-cis. |
| 200 | 1,800 | 0–5 | 3 | 404/120 | 200 | 1.6048 gm. NaBH₄<br>1.6017 gm. C.O.<br>.8 ml. Pyridine<br>20 ml. MeOH<br>20 ml. Hexane | 1 | 81.9% Trans.<br>16.8% Neo.<br>1.2% 9-cis. |
| 200 | 1,800 | 0–5 | 6 | 406.3/120 | 200 | 1.5342 gm. NaBH₄<br>1.6368 gm. C.O.<br>.8 ml. Pyridine<br>20 ml. MeOH | 1 | 75.2% Trans.<br>21.6% Neo.<br>3.2% 9-cis. |
| 200 | 900 | 0–5 | 3 | 401.7/60 | 200 | 1.6096 gm. NaBH₄<br>1.6239 gm. C.O.<br>.8 ml. Pyridine<br>20 ml. MeOH<br>10 ml. Hexane | 1 | 79.2% Trans.<br>18.6% Neo.<br>2.1% 9-cis. |
| 50 | 100+Pyridine | 56 | 22 | —/54 | | 404.4 mg. NaBH₄<br>10 ml. H₂O<br>10 ml. MeOH | 1 | 65.5% Trans.<br>32.1% Neo.<br>2.4% 9-cis. |
| 200 | 800+20 Pyridine | 70 | 3 | 198.4/20 | | 1.6051 gm. NaBH₄<br>1.6590 gm. C.O.<br>20 ml. MeOH<br>40 ml. Hexane | 1 | 62.7% Trans.<br>33.8% Neo.<br>3.4% 9-cis. |
| 200 | 350+20 Pyridine | 54–56 | 10 | 202.4/50 | | .8028 gm. NaBH₄<br>10 ml. H₂O<br>600 ml. Hexane<br>200 ml. H₂O | 1 | 75% Trans.<br>22.1% Neo.<br>2.9% 9-cis. |

[1] C.O.=corn oil.  [2] Minutes.

EXAMPLE IV

The procedure of Example I is repeated but using the following vitamin A esters in place of the palmitate: acetate, butyrate, α-methyl - α - ethylcaproate, α,α-dimethylpalmitate, β-naphthoate, anthraquinone β-carboxylate and α-phenylazobenzoate. In each case, less than 5% 9-cis isomer, generally 3% or less, is formed in the equilibrium mixture of esters.

EXAMPLE V

Repetition of the procedure of Example I but using the following quantities of reactants produces equilibrium mixtures of vitamin A palmitate and neovitamin A palmitate containing, on the average, 3% or less of 9-cis isomer.

| Vitamin A Palmitate (g.) | Pyridine (ml.) | Iodine (mg.) | NaBH₄ (g.) |
|---|---|---|---|
| 200 | 400 | 50 | 0.2 |
| 200 | 400 | 100 | 1.0 |
| 200 | 400 | 300 | 2.4 |
| 200 | 400 | 400 | 2.0 |

EXAMPLE VI

The procedure of Example II is repeated but using the following basic amines in place of pyridine to produce equilibrated mixtures of vitamin A palmitate-neovitamin A palmitate having less than 5% 9-cis isomer.

Piperidine
β-Methyl picoline
Dihydropyridine
Tetrahydropyridine
3,5-dimethyllutidine
4-ethyllutidine
Quinoline
Pyrimidine
4-methyl-3-ethylcollidine
2-methyl-4-ethylcollidine
Pyrrole
Pyrrolidine
Pyrrolidone
N-methylpyrrolidone
Pyridazine
Pyrazine

EXAMPLE VII

Isomerization-transesterification

Vitamin A acetate (328 g., low potency concentrate obtained from the Isler synthesis, 1.2–1.8 million units/g.) is added to a solution of 328 mg. iodine in 500 ml. of pyridine under an atmosphere of nitrogen and the mixture heated to 56° C. for 10 hours. The reaction mixture is cooled to room temperature and sodium borohydride (1.61 g.) in 16.4 ml. water added with stirring. After 1 hour methyl palmitate (270.5 g.) and 10 ml. of 20% sodium hydroxide in methanol are added. The system is evacuated to 20 mm. mercury pressure and stripped at 50°–60° C. An additional portion, 15 ml., of 20% sodium hydroxide in methanol, is added, the pressure dropped to <2 mm. mercury and the mixture stripped at 50°–60° C. for 45 minutes. Reaction is stopped when 0.95 mole of methyl acetate are recovered. The mixture is cooled to room temperature and 500 ml. of 95% methanol containing 10.6 ml. glacial acetic acid added. After 15 minutes stirring the mixture is allowed to settle. The lower layer is dropped into 1000 ml. hexane, the hexane solution washed with 1000 ml. water, decolorized with 25 g. charcoal then filtered. The charcoal cake is washed with 50 ml. hexane and the combined hexane solutions stripped free of hexane and methanol.

The product has a Gardner color of 11 and contains less than 3% of 9-cis isomer. Vitamin A palmitate prepared in this manner in the absence of iodine-basic amine and sodium borohydride-basic amine treatment requires a 10-fold dilution with hexane to give a Gardner color of 14–17.

EXAMPLE VIII

A mixture of vitamin A acetate crystals (328 g.) and methyl palmitate (270.5 g.) is warmed gently and stirred until solution is complete. Pyridine (300 ml.) is added, the mixture heated to 50° C. and a solution of iodine (403.3 mg.) in 28 ml. pyridine added over a 5 minute period. The mixture is stirred for 10 hours at 50°–55° C., then cooled to room temperature. Sodium borohydride (1.6026 g.) dissolved in 10 ml. water is added, the mixture stirred for 1 hour, then stripped of pyridine at 5–10 mm. mercury and 15°–20° C.

The reaction mixture is warmed to 60° C. and 10 ml. of 20% sodium hydroxide in methanol added. The mixture is stripped for 2 hours at the end of which time a second 10 ml. portion of 20% sodium hydroxide in methanol is added. The mixture is stripped for 1 more hour after which a third 10 ml. portion of 20% sodium hydroxide in methanol is added and the mixture stripped for an additional hour. A solution of 500 ml. of 95% methanol containing 12.2 ml. of glacial acetic acid is added, the mixture stirred for 30 minutes at room temperature. The phases are allowed to separate, the lower layer dropped into 1 liter of hexane and washed twice with 2.2 liters of water. The washed hexane solution is treated with 26 g. charcoal, then filtered and the solvent is distilled off. The light-colored product (Gardner color of 8) is found to contain 64.3% vitamin A palmitate, 34.5 neovitamin A palmitate and 1.2% 9-cis isomer.

In like manner, vitamin A acetate is transesterified to the propionate, butyrate, α-methyl-α-ethylcaproate, β-naphthoate and α,α-dimethylpalmitate using ethyl propionate, methyl butyrate, ethyl α-methyl-α-ethylcaproate, propyl-β-naphthoate and methyl α,α-dimethylpalmitate in place of methyl palmitate.

EXAMPLE IX

Esterification of vitamin A alcohol with vegetable oil

Vitamin A alcohol (286 g.), vegetable oil (500 ml.), and a solution of 500 mg. of iodine in 250 ml. of pyridine are heated to 60° C. and stirred for 4 hours. At the end of this time sodium borohydride (2 g.) in 15 ml. of water is added, the mixture stirred for 1 hour at 25–30° C. The reaction mixture is stripped for 1 hour under 20 mm. mercury to remove pyridine. Twenty-five ml. of a 20% solution of sodium hydroxide in methanol is added and the mixture subjected to 1 mm. mercury for 2 hours to remove methanol and pyridine. The mixture is cooled to 25–30° C. and 500 ml. of 95% of methanol containing 12 ml. of glacial acetic acid added. The reaction mixture is worked up according to the procedure of Example VIII.

The product thus obtained contains less than 3% of the 9-cis isomer in the equilibrated mixture of vegetable oil esters of vitamin A and neovitamin A, and is considerably lighter in color than a mixture of esters prepared in the absence of sodium borohydride and pyridine.

Lithium borohydride and potassium borohydride perform equally as well in this process as sodium borohydride.

EXAMPLE X

A mixture of vitamin A acetate (32.8 g. of low potency concentrate as in Example VII) is added to a solution of 32.8 mg. iodine, 10 ml. of pyridine and 50 ml. hexane under an atmosphere of nitrogen. The mixture is heated at 56° C. for 10 hours, then cooled to room temperature. Sodium bisulfite (20 mg.) in 20 ml. water is added and the mixture stirred for 30 minutes. It is then washed with 3× 15 ml. volumes of water and the solvent removed by evaporation in vacuo at below 40° C.

To the residue is added 50 ml. hexane, methyl palmitate (27 g.) and 1 ml. of 20% sodium hydroxide in methanol. The system is evacuated to 20 mm. mercury pressure and stripped at 50°–60° C. An additional portion, 1.5 ml., of 20% sodium hydroxide in methanol, is added, the pressure dropped to <2 mm. mercury and the mixture stripped at 50°–60° C. for 45 minutes. Reaction is stopped when 95% of the methyl acetate is recovered. The mixture is cooled to room temperature and 50 ml. of 95% methanol containing 1.1 ml. glacial acetic acid added. After 15 minutes' stirring the mixture is allowed to settle. The lower layer is dropped into 100 ml. hexane, the hexane solution washed with 100 ml. water, decolorized with 2.5 g. charcoal then filtered. The charcoal cake is washed with 5 ml. hexane and the combined hexane solutions stripped free of hexane and methanol.

The product, a molasses color, is much darker than the vitamin A palmitate prepared in Example VII.

EXAMPLE XI

Vitamin A acetate (32.8 g., low potency concentrate, 1.2–1.8 million units/g.) is added to a solution of iodine (32.8 mg.) in 500 ml. hexane and the reaction mixture stirred in subdued light for two hours at room temperature. At the end of this period sodium bisulfite (305 g.) and 305 ml. water are added and the mixture stirred for 30 minutes. It is then washed with three 100 ml. volumes of water and the solvent removed by evaporation in vacuo at below 40° C.

To the residue there is added 656 mg. sodium borohydride, 250 ml. pyridine, 27 g. methyl palmitate and 1 ml. of 20% sodium hydroxide in methanol. The mixture is worked up according to the procedure of Example X. The product thus obtained is much lighter (Gardner color of 16) than a similar product transesterified in the absence of borohydride-pyridine.

EXAMPLE XII

A charge, consisting of 200 ml. of pyridine and 100 mg. of iodine was placed in a five hundred milliliter flask which was equipped with a stirrer, a thermometer, a nitrogen inlet and outlet and was submerged in a constant temperature heating bath. The mixture was stirred, under nitrogen, until the iodine had dissolved and 100 grams of vitamin A acetate concentrate was added. The distribution of vitamin A isomers in the concentrate was 26% all trans, 5% 13-cis, 48% 11-cis, 20% 11,13-di-cis and less than 2% 9-cis. The distribution of the vitamin A isomers was determined by a thin layer chromatographic technique. The biological potency of the charged vitamin A concentrate was determined to be 770,000 units per gram, by the same thin layer chromatographic technique. The mixture was heated to between 50° C. and 60° C. and held between these temperatures for 10 hours. Subsequently, the reaction mixture was cooled to room temperature and quenched with a solution of 0.5 gram of sodium borohydride dissolved in 3 ml. of deionized water. The mixture was stirred at room temperature for 1 hour after which 500 ml. of hexane was added. The mixture was then transferred to a two liter separatory funnel in which it was washed with deionized water, five aliquots of 500 ml. each. All the decanting and washing procedures were performed under a nitrogen atmosphere, where feasible. The product, after washing, was transferred to a stripping flask in which the solvents were removed. One hundred grams of vitamin A concentrate was recovered. This product concentrate manifested biological potency of 2,050,000 units per gram. The biological or actual potency of the vitamin A concentrate, after isomerization, was thus increased 166 percent, the increase being calculated as:

$$\frac{2,050,000 - 770,000}{770,000} \times 100 = 166\%$$

The isomer distribution in the vitamin A concentrate which was obtained after isomerization was 65% all trans, 32% 13-cis, less than 2% 11-cis, less than 2% 11,13-di-cis and less than 2% 9-cis. The concentration of 11-cis and 11,13-di-cis were below the detection level while the concentration of 9-cis was equivalent to a trace of the isomer being present.

EXAMPLE XIII

A flask, of five hundred ml. capacity, was charged with 200 ml. of dry pyridine to which 100 mg. of iodine was added. The mixture was stirred, under nitrogen, until the iodine was dissolved. Upon dissolution, 100 grams of vitamin A acetate concentrate was added to the solution. The vitamin A acetate concentrate manifested a biological or actual potency of less than 1,550,000 units per gram. The distribution of vitamin A isomers in the concentrate was 61% all trans, 5% 13-cis, 24% 11-cis, 10% 11,13-di-cis and 0–3% 9-cis. The biological potency and the isomeric distribution were determined by thin layer chromatographic techniques. The mixture was heated to 50–55° C. and held at this temperature level for 10 hours, under nitrogen, with stirring. After this period the reaction mixture was cooled to 20–25° C. and quenched with a solution of 0.5 gram of sodium borohydride dissolved in 3.0 ml. of deionized water. The resultant mixture was stirred at room temperature for 1 hour after which 500 ml. of hexane was added. The composite mixture was transferred to a two liter separatory funnel and was washed five times with 500 ml. of deionized water. The washing procedures were performed under a nitrogen atmosphere, where possible. The resultant mixture was stripped free of hexane and pyridine and 100 grams of vitamin A concentrate was recovered. The product concentrate manifested a biological or actual potency of 2,390,000 units per gram. The isomeric distribution of vitamin A in the mixture, subsequent to isomerization, was 65–67% all trans vitamin A, 30–33% 13-cis, 0–3% 11-cis, 0–2% 11,13-di-cis, and 0–3% 9-cis. The 11-cis isomer was detected at the threshold of the detection level whereas the 11,13-di-cis and the 9-cis isomers were at levels below the detection level. The increase in biological potency due to isomerization was 54 percent, calculated as in Example XII, on the basis of biological or actual potencies before and after isomerization.

What is claimed is:

1. A process which comprises treating a compound selected from the group consisting of vitamin A, neovitamin A, the 9-cis vitamin A isomer, the 9,13-di-cis vitamin A isomer, the 11-cis vitamin A isomer, the 11,13-di-cis vitamin A isomer and the carboxylic acid esters thereof with iodine in the presence of a basic amine at a temperature of from about 0° C. to about 115° C. in a solvent system selected from the group consisting of basic amine and hexane.

2. The process of claim 1 wherein the basic amine is pyridine.

3. A process for the isomerization of a compound selected from the group consisting of vitamin A, neovitamin A, the 9-cis vitamin A isomer, the 9,13-di-cis vitamin A isomer, the 11-cis vitamin A isomer, the 11,13-di-cis vitamin A isomer and the carboxylic acid esters thereof which comprises treating said compound with iodine in the presence of a basic amine at a temperature of from about 0° C. to about 115° C. in a solvent system selected from the group consisting of basic amine and hexane.

4. The process of claim 3 wherein the basic amine is pyridine.

5. The process of claim 4 wherein the weight ratio of pyridine:iodine:compound is from about 400:1:4000 to about 8000:8:4000.

6. The process of claim 5 wherein the weight ratio of pyridine is from about 400:1:4000 to about 8000:4:4000.

References Cited

UNITED STATES PATENTS

| | | | |
|---|---|---|---|
| 2,979,445 | 4/1961 | La Vigne et al. | 204—154 |
| 3,136,794 | 6/1964 | Maxwell | 260—410 |

HENRY R. JILES, *Primary Examiner.*